Figure 2:
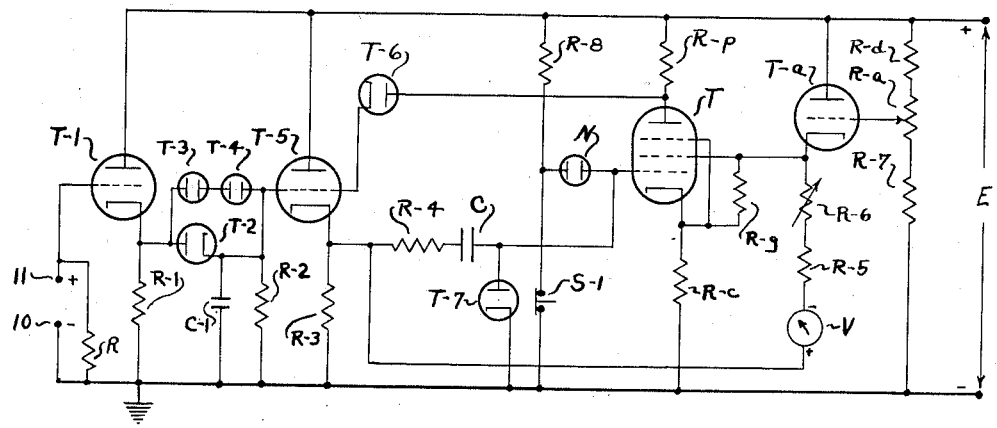

Sept. 22, 1959

J. E. STARR 2,905,879

ELECTRONIC MEMORY CIRCUIT

Filed Oct. 1, 1954

INVENTOR.
JAMES E. STARR
BY
Golrick and Golrick
ATTORNEYS

United States Patent Office 2,905,879
Patented Sept. 22, 1959

2,905,879

ELECTRONIC MEMORY CIRCUIT

James E. Starr, Detroit, Mich., assignor to Control Devices, Inc., Detroit, Mich., a corporation of Michigan Application October 1, 1954, Serial No. 459,783

8 Claims. (Cl. 320—1)

The present invention relates to an electronic memory circuit for measurement of transient phenomena convertible—by means of a transducer or other such device—into a potential applied to the circuit; and more particularly to a circuit adapted to employ more common vacuum tubes than those required heretofore in simple successful circuits for the measurement of transient peak impulses.

Where the amplitude or peak value of a voltage impulse is to be measured and the impulse duration is relatively short, measurement circuits have been used including a capacitor to which the impulse potential is applied either directly or with amplification to develop a charge which is retained for a sufficient time for a measurement of the corresponding capacitor potential to be made. Circuits of this type have been devised particularly for use where an indication of the measurement is to be held by a panel meter. A circuit having a high input impedance, to the input of which the memory capacitor is coupled, is desirable in order that control grid current in the measuring circuit not disturb the charge and measured potential on the memory capacitor. Now prior circuits for this purpose have used special tubes, for example, electrometer tubes especially of the sub-miniature type, which operate with low control grid current and have a high input impedance, but on the other hand have had certain disadvantages with respect to amplification factor and transconductance.

By the present invention a circuit is provided wherein conventional or standard vacuum tubes may be operated over a considerable range with practically zero control grid current, that is with nearly infinite input impedance at low frequencies, so that a capacitor used as a memory device in the control grid circuit is not disturbed by subsequent stages of the measuring circuit as a whole by which measurement of the capacitor potential is attained. Further between the input of the measuring circuit and the memory circuit or capacitor itself a pulse stretching circuit is interposed. This stretching circuit includes a capacitor of small capacitance quickly charged by application—with or without amplification—of the incoming pulse signal, the potential developed thereon (in proportion to the input) determining the charge developed on a much larger memory capacitor. In the circuit to the input of which the potential of the memory capacitor is applied for measurement, a tetrode or pentode is used operating at practically zero control grid current, in the manner hereinafter explained.

Now under specified operating conditions, the velocity, in the region near the control grid, of electrons emitted by the cathode is the primary factor affecting the control grid current in a number of multi-element tubes wherein the effect of plate voltage is negligible. With low velocity, a positive or electron grid current results from electron acceptance by the grid acting as anode with respect to the cathode, whereas at higher velocities, increased ionization of residual gas within the cathode-screen grid interspace with attendant ion flow to the control grid, as the most negative proximate element, results in inverse grid current. Hence if the electron velocity can be controlled to a critical point between these two conditions where the ion and electron currents neutralize each other, a zero net grid current is obtained. Thus by operating certain pentodes having high plate resistance and transconductance, such as a 6AK5, at low plate current (less than 100 microamps.), the electron velocity from cathode to screen grid is nearly independent of plate voltage, so that the electron velocity may be determined to a value resulting in zero net control grid current by adjusting the screen potential. Where the potential of a memory capacitor is applied for measurement to the control grid of a tube operated under such conditions, the measuring functions of the tube and associated circuit do not disturb the capacitor charge. Further, capacitor or other memory circuit leakage tending to discharge the memory condenser may be neutralized through a compensating grid current permitted by a screen potential adjusted a corresponding degree off from a true zero grid current setting, which gives the net effect of a memory circuit without leakage operating for measurement purposes at zero grid current. A circuit is described whereby the screen potential may be adjusted and maintained at a value which results in zero control grid current and avoids degeneration despite input signal potential variations.

Figure 1:
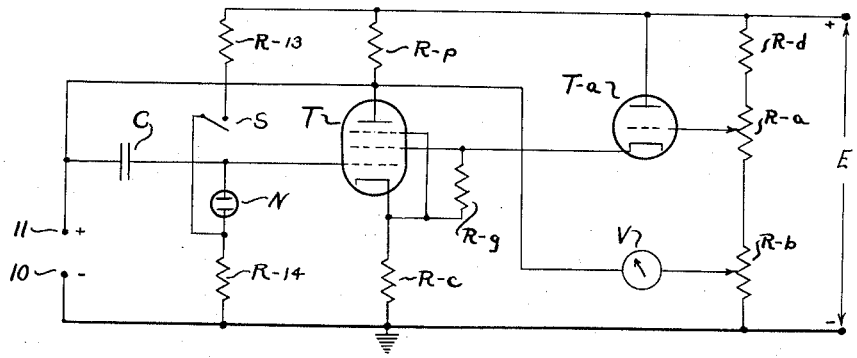

The general object of the present invention is the provision of a peak impulse meter circuit adapted to measurement of the amplitude of transient phenomena having short duration. Another object of the invention is the provision of a circuit wherein the potential of a memory capacitor may be applied as the input in the control grid circuit of a vacuum tube operated at an essentially zero grid current condition to avoid disturbing the charge of the capacitor, that is the control grid circuit provides a very high input impedance. A further object is the provision of a circuit for applying to the screen grid element of a multi-element tube a potential of such value as maintains a net zero control grid current condition. Another object of the invention is the provision of novel low leakage means for resetting the memory circuit. Another object is the provision of a memory circuit including a vacuum tube operated at substantially zero control grid current with a memory capacitor having one side connected to the control grid and capacitor charging diode means, and the other side connected at least mediately to the plate, whereby a feed back arrangement is had for maintaining the capacitor charge and potential developed in response to an impressed signal. Other objects and advantages of the invention will appear from the following description and the drawings wherein:

Fig. 1 is a circuit simplified for purposes of explaining certain features of the invention; and Fig. 2 is a complete circuit of the invention in practical form for versatile application in measurement of the amplitude of transient phenomena.

In Fig. 1, T is a pentode such as a 6AK5 tube intended to operate, for measurement of a potential developed on a memory capacitor C, at zero grid current, and T–a a triode as a cathode follower with cathode connected to the screen grid of T as a means of applying a screen potential which prevents degeneration and is invariant despite variations of input signals to T. The cathode of T is connected to the suppressor grid directly, to the screen through resistor R–g and to ground through resistor R–c. The plate of T is connected through the load resistor R–p, and the plate of T–a directly, to the positive side of a source of plate operating potential E, and the negative side of the latter to ground. The potentiometer R–a connected in series with potentiometer R–b and resistor R–d across the potential source E, with its slide-arm connected to the control grid of T–a, serves for adjustment of the screen grid potential, although a similar potentiometer connection between cathode and ground might be used. The output of the circuit goes to the voltmeter V with positive terminal connected to the plate of T and negative terminal to the slide arm of potentiometer R–b for meter zeroing rather than to ground. The negative input terminal 10 is connected to ground, while the positive terminal 11 is connected directly to the plate and through the memory capacitor C to the control grid of T. In passing it may be noted that with C omitted and input terminal 11 connected not to the plate but directly to the control grid of T and with the negative side of the output taken from ground rather than R–b, the basic circuit for operation at zero control grid current is generalized for other input and output uses, and is of wider utility and application than to merely a memory device.

By grounding the control grid of T (after the screen potential is adjusted by R–a for zero control grid current) and thereby removing any control grid bias, the ensuing current through R–p causes the plate potential to drop to a very low value with consequent discharge of the capacitor C to ground. Thereafter since the potential stored on the capacitor is zero, the meter V is zeroed by potentiometer R–b. A positive potential, as an input signal across terminals 10 and 11, is applied to the plate of T and also coupled to the control grid thereof, thereby charging the capacitor to the input potential through grid current with the now positive control grid and the cathode of T acting as a diode. Since in T the plate is coupled through the capacitor to the control grid in a sense opposing change in plate potential, it is impossible for the plate to return to the previous potential determined when the meter was zeroed, so that after the plate potential drops slightly, perhaps on the order of one volt, to a final value where the control grid is within its operating range, no further drop may occur until the condenser is discharged either by grounding or slow leakage. If a subsequent signal of higher potential is applied, the capacitor is of course charged to a correspondingly high potential. The final plate potential then is indicated on the meter V and will be held for a long period allowing visual observation of a peak value despite the fleeting duration of a transient phenomenon measured. The meter may be calibrated of course to compensate for the initial slight plate potential drop.

A reset or memory erasing switch may be provided between the control grid side of C and ground for discharging C. However if the charge developed on C in consequence of an input signal is to remain constant until purposely erased, such obvious erasing means must be a low leakage switch, carefully made and including materials of low leakage high insulation characteristics and low moisture absorbancy.

As a simple inexpensive alternative to the use of such a switch, a novel reset circuit is provided wherein a neon tube N serves as an electronic switch controlled by the manually operated reset switch S which may be any of the conventional inexpensive normally open switch types. A 0.47 megohm discharge current limiting resistance R–13 connected to the positive side of the B supply and to switch S and the NE–2 type neon tube N from S to the grid side of memory condenser C provide a path for discharging C as hereinafter explained, while the 0.33 megohm resistor R–14 from the switch side of N to ground normally maintains the potential across N at a low nonionizing value.

Now since the grid potential of T is on the order of one to three volts relative to ground, a value considerably below the neon ionization potential, as long as S is open so that N is not conducting by ionization, the resistance of N is extremely high due to its physical structure with leads through the glass tube. Hence in this environment this reset circuit is the equal of the best contact type low leakage switches.

By closing reset switch S, a potential is applied to tube N to ionize the neon, causing N to permit rapid electron flow from the grid side of C as a discharge current to the positive B supply line. With the complete discharge of C, although the current flow through lamp N would tend to carry the control grid of T positive, current flow by diode conduction between the control grid and cathode of T prevents the development of such positive potential at the control grid, and upon opening of S the grid is at ground potential.

The circuit of Fig. 2 embodies the essential principles of Fig. 1, but is adapted practically for more flexible and precise measurement applications. Here T again is a 6AK5 tube operated at net zero grid current and T–a is a triode related to T as a cathode follower means or degenerative voltage regulator for supplying the required screen potential for the latter, the connections between these tubes being similar to that of Fig. 1. However, the memory capacitor C on the control grid of T is not connected directly to the plate of T, nor do the control grid and cathode of T at any time serve as a diode pair for charging C. There is provided a pulse stretching circuit including triodes T–1 and T–5, actually the two triode sets of a single 12BH7 tube though here shown separately, a 0.001 mfd. polystyrene capacitor C–1, and T–2 one diode pair of a 6AL5 tube for charging C–1. T–1 and T–5 to function as cathode followers have plates connected to the positive side of a 300 v. plate potential source E, and cathodes connected to ground, i.e. the negative side of E, through 47,000 ohm resistors R–1 and R–3 respectively.

The input terminals 10 and 11 are joined to ground and control grid of T–1 respectively, C–1 is connected between ground and cathode of T–2, and the anode of the latter to the cathode of T–1, whereby the storage capacitor C–1 of the pulse stretching circuit is charged in response to the cathode potential of T–1, while a high value resistor R–2, 200 megohms, across C–1 furnishes a discharge path therefor. A 1 megohm resistor R may be used from ground to control grid of T–1 to keep the latter element at unambiguous potential, for example when input sources are changed during use of an instrument embodying the circuit. The cathode of T–2 is connected indirectly back to its own plate through the two NE–2 neon discharge tubes T–3 and T–4 in series and directly to the control grid of T–5. The discharge tubes, in limiting the grid potential of T–5 to about 140 volts above ground, guard the meter from damage by high input signals.

The control grid of T–5 is also connected to the cathode of a 6AL5 diode T–6 with plate joined to the plate of T. T–2 and T–6 though represented as separate tubes may be the two diode pairs of a single 6AL5. The memory capacitor C is a 0.05 mfd. polystyrene capacitor with one side connected to the control grid of T and to the anode of a 6AL5 diode pair T–7 with cathode to ground, and the other side through 4,700 ohm charging current limiting resistor R–4 to the cathode of T–5, so that C is charged by T–7 to a potential corresponding to the cathode potential of T–5. R–4 limits the maximum charging current for C to avoid grid current in T–5 when a fast rising high peak input signal occurs. T–6 in effect serves as a switch connecting the plate of T to control grid of T–5 for holding action when C is charged in response to an input signal as will be explained. C on the control grid of T may be considered to be mediately, i.e., indirectly, connected back to the plate of T through the cathode-grid pair of T–5 and the diode T–6.

The positive terminal of meter V, a 200 microamp. meter, is connected to the cathode side of R–4; and its negative terminal, through the 0.4 megohm fixed resistor R–5 and for meter adjustment the 0.1 meg. variable resistor R–6 in series, to the cathode of T–a, a point of positive potential. This meter connection to a point of positive potential provides for suppression of the lower part of the meter scale, usually non-linear over about the first ten percent. In this circuit an input signal of 100 volts will give full scale deflection.

The resistors, R–p of 2 megohms, R–c of 100 ohms, R–g of 22,000 ohms, R–d of 0.62 megohm, and screen potential adjusting potentiometer R–a of 0.25 megohm, are connected with respect to T and T–a as in Fig. 1 with like functions, but a fixed 0.125 megohm resistor R–7 is used in place of potentiometer R–b in the voltage divider branch from which the adjustable control grid potential of T–a is taken.

As a memory erasing or resetting device, a low leakage normally-open mechanical type switch may be connected from the control grid of T to ground in the circuit of Fig. 2, or alternatively the electronic switch arrangement of Fig. 1 may also be used in Fig. 2 with the neon lamp connected to the control grid of T for discharge of capacitor C. However a modification of the electronic erasing switch means is shown in Fig. 2, wherein one side of NE–2 type neon bulb N is connected to the control grid of T and the other through a discharge current limiting resistor R–8 of about 0.5 megohm to the positive side of the plate potential source E providing a discharge path for capacitor C to the positive side of the B potential source. A conventional normally-closed mechanical type switch S–1, for example a push button switch, connected from the resistance side of N to ground keeps the potential across N at a very low value below ionization potential so that N is non-conducting as long as S–1 is not opened, and therefore the discharge path for C is effectively blocked. Here again, as in Fig. 1, the need for a special, expensive low leakage type reset switch is obviated.

When reset switch S–1 is opened, since the ground connection of R–8, hence of N, is broken, the potential applied by means of R–8 across N is such that the neon in N becomes ionized and accordingly C discharges through R–8 to the positive side of the B potential source by action similar to that in Fig. 1. Here again with complete discharge of C, the current flow through lamp N would tend to carry the control grid of T positive, but with the anode of T–7 directly connected to and therefore at the same potential as the control grid, T–7 becomes conducting to keep the control grid in T substantially at ground potential and C discharged until S–1 is closed. Of course when switch S–1 is closed, grounding R–8, the potential causing current flow in tube N is removed and it then again becomes a high resistance non-conducting element.

When no signal is applied and the circuit has been reset, the plate potential of T is say 0.5 to 5 volts above ground and its grid potential 1 to 3 volts negative with respect to the cathode, the latter value remaining quite well fixed during all stages of operation since the grid current is effectively zero and further because of the high gain in T with the disclosed feed-back arrangement. The cathode of T–1 is say 15 volts above ground for the no-signal or quiescent condition, and so also the cathode of T–2 and connected grid of T–5. Hence as the cathode of T–6 is much more positive than its anode it remains cut off. The screen grid operating potential of T is on the order of 50 volts, but of course set for a net zero grid current condition.

When a positive pulse signal is applied across input terminals 10 and 11, since the anode of T–2 rises in potential with that of the connected cathode of cathode follower T–1, diode T–2 charges C–1 to a potential, above the quiescent value, corresponding to the pulse appearing on the cathode of T–1 despite short duration of the input signal peak, due to the small capacity of C–1. Such potential rise of C–1 applied to the control grid of the second cathode follower T–5 causes rise of its cathode potential, which coupled through R–4 and C to the anode of T–7, brings the latter into conductance as a low impedance path to charge C. Though discharge of C–1 through R–2 occurs in relatively short time because of its low capacity, the charging action of T–7 and the rise of cathode potential of T–5 are fast enough to charge C. During the charging of C, the charging current through T–7 causes the control grid potential of T to rise, in turn causing the plate potential of T, and hence of T–6, to drop to a value a few volts above ground keeping T–6 cut off.

With drop of signal potential and consequent discharge of C–1, a drop in the cathode potential of T–5 tends to occur, which, being coupled by C to the control grid of T, immediately causes a drop in plate current through resistor R–p with attendant rise in plate potential of T. Since anode of T–6 is connected to that of T, the diode T–6 comes into conduction, and with the resulting current flow through R–2 the grid potential of T–5 rises to prevent further cathode potential drop at T–5. The cathode potential of T–5 will thereafter remain constant to give a constant reading at meter V until either the reset switch S is opened to discharge C or a higher input signal is applied across 10 and 11. The 100% feed back provided results in great stability during the holding action. The small initial drop in the T–5 cathode potential and charged potential of C, which occurs during the time that T–6 is brought into conduction, is compensated in the calibration of an instrument using this circuit.

When the reset or erasing switch S is opened to bring N into conduction and discharge C as previously described, the attendant sudden rise of the control grid of T to a less negative potential value relative to its cathode causes the plate potential of T to drop to a low value, a volt or less, cutting off T–6 and the corresponding current through R–2. Hence the grid, and therefore cathode potential, of T–5 drops to a point where the diode T–2, with its cathode at like potential, comes into conduction, so that the current through R–2 establishes a control grid potential on T–5 stabilizing the cathode of the latter at a no-signal, zero measurement value.

Although the circuit of Fig. 1 is capable of measuring the amplitude of signals of but few microseconds' duration, to that end it is necessary that the capacity of C be but a few hundred m.m.farads for rapid charging and that the screen potential be carefully adjusted to a value which becomes quite critical for such operation. On the other hand, the circuit of Fig. 2 using a large memory capacitor C as permitted by the pulse stretching circuit, may readily attain 2% accuracy for an input signal of less than one micro-second duration, with faster response time easily achieved through proper choice of components and slight circuit modifications. A stability is obtained together with this excellent high frequency response such that for a given measurement a constant meter reading may be held more than thirty minutes without change and without the need of critical and frequent adjustments in calibration. Since much longer memory or storage time can be attained by careful construction, choice of components and adjustment to operating conditions, this memory circuit can be used for electronic computer applications.

It is obvious that with suitable transducers various amplifiers, including, if desired, a voltage inverter circuit for measuring negative as well as positive pulses, may be used to apply a signal to this circuit of Fig. 2 corresponding in potential variation proportionately to the amplitude of a phenomenon to be measured. So also other indicating instruments than the disclosed D.C. meters may be used to indicate the potential stored on memory capacitor C, for example a vacuum tube voltmeter.

I claim:
1. An electronic memory circuit comprising a first vacuum tube having a cathode element, control grid, screen grid, and anode element; a source of plate potential with negative side serving as ground; a memory capacitor having one side connected to said control grid; a load resistor connecting the anode to the positive side of said source and a second resistor connecting the cathode to ground; output lead means having one side connected to the said second side of the capacitor and the other side to a point of fixed potential above ground; means for applying a potential to said screen grid whereby the control grid current of said vacuum tube is maintained substantially zero; a first cathode follower circuit across said potential source; circuit input lead means for applying the positive side of a signal source to the control grid in the cathode follower circuit and the negative side to ground; a pulse stretching circuit including a second cathode follower circuit across said potential source, a first diode with anode connected to the cathode in the first cathode follower circuit and cathode to the control grid of the second cathode follower circuit, a capacitor connecting the cathode of said diode to ground and being of small capacity relative to the memory capacitor, and a leakage resistance in parallel with the second said capacitor; the second side of said memory capacitor being connected to the cathode in the second said cathode follower circuit; second diode means connected with cathode to ground and anode to the first side of the memory capacitor for charging the latter; and third diode means with anode and cathode connected to the anode and control grid of the first vacuum tube and second cathode follower respectively.

2. An electronic memory circuit comprising a source of operating plate potential with negative side serving as ground; a negative input lead connected to ground, and a positive input lead; a low-leakage memory capacitor having one side joined to the positive input lead; a plate load resistor; a vacuum tube having a cathode connected through a low resistance path to ground, a plate connected by said load resistor to the positive side of said potential source, a screen grid, and a control grid connected to the second side of said capacitor, whereby said vacuum tube provides means for swinging the plate potential in response to a potential change developed across said capaictor; diode means interposed between ground and the second side of said capacitor for charging the same in response to a signal potential applied across said input leads; a potential source adapted to apply a selected fixed potential to said screen grid for operation at a zero net current in the control grid branch of the circuit; a first output lead joined to the first side of the capacitor and a second output lead connected to a point of selected fixed potential.

3. An electronic memory circuit comprising a plate potential source having a negative side serving as ground in the circuit and a positive side; a negative input lead connected to ground and a positive input lead; a high gain amplifier network across said potential source including a high transconductance vacuum tube having a screen grid; adjustable means for applying a selected operating potential to said screen grid; a cathode follower network across said potential source; a low leakage memory capacitor coupling the cathode of the cathode follower to the control grid of said vacuum tube; diode means connected between the vacuum tube control grid and ground for charging said capacitor in response to potential pulse at the cathode of the cathode follower; a pair of disconnecting diodes having cathodes connected to the control grid of said cathode follower, one of said disconnecting diodes having its anode connected to said positive input lead and cathode connected by a resistor to ground and the anode of the other disconnecting diode to the plate of said vacuum tube whereby the cathode follower control grid is connected to said positive input lead upon occurrence of an input signal, and to the anode of the vacuum tube after charging of said capacitor to provide 100% feed-back to the vacuum tube control grid; and positive and negative output leads connected respectively to the cathode of the cathode follower and to a point of selected potential relative to ground.

4. An electronic memory circuit as described in claim 5 including an erasing or reset switching circuit adapted to use of a conventional contact switch as a reset initiating control, said erasing circuit comprising a neon tube having one side connected to the control grid of the vacuum tube, and a network connected to the other side of the neon tube including said reset initiating control switch and providing a capacitor discharge path to the positive side of said potential source, said network being adapted to maintain the potential across the neon tube at a non-ionizing potential until the control switch is operated, whereby on operation of the switch an ionizing potential is applied to the neon tube to render the same conducting for discharge of the capacitor.

5. A circuit as described in claim 3 wherein a capacitor is connected between the cathode of said one of said disconnecting diodes and ground to provide a pulse stretching network.

6. An electronic memory circuit comprising a source of operating plate potential with negative side serving as ground; a negative input lead connected to ground, and a positive input lead; a low-leakage memory capacitor having one side joined to the positive input lead; a plate load resistor; a vacuum tube having a cathode connected through a low resistance path to ground, a plate connected by said load resistor to the positive side of said potential source, a screen grid, and a control grid connected to the second side of said capacitor, whereby said vacuum tube provides means for swinging the plate potential in response to a potential change developed across said capacitor; means providing a feed-back path between said plate and the positive input lead to said capacitor; diode network means interposed between ground and the second side of said capacitor for charging the same in response to a signal potential applied across said input leads; a potential source adapted to apply a selected fixed potential to said screen grid for operation at a zero net current in the control grid branch of the circuit; a first output lead joined to the first side of the capacitor and a second output lead connected to a point of selected fixed potetnial.

7. A circuit as described in claim 6, wherein the plate load resistor is of a high value relative to the potential source for operation of the tube at low plate current.

8. A circuit as described in claim 6 in combination with a pulse stretching circuit, the output of the latter circuit being applied as the input to the input leads of the former.

References Cited in the file of this patent

UNITED STATES PATENTS

| 2,358,325 | Fyler | Sept. 19, 1944 |
| 2,517,863 | Froman | Aug. 8, 1950 |
| 2,523,468 | Hare | Sept. 26, 1950 |
| 2,547,978 | Ryerson et al. | Apr. 10, 1951 |

FOREIGN PATENTS

| 697,879 | Great Britain | Sept. 30, 1953 |

OTHER REFERENCES

Article by Richard F. Blake published in Electronics, July 1954, pages 180 and 188. (Only page 180 relied upon.) (Copies available in Scientific Library or 324–103P.)

UNITED STATES PATENT OFFICE

CERTIFICATE OF CORRECTION

Patent No. 2,905,879            September 22, 1959

James E. Starr

It is hereby certified that error appears in the printed specification of the above numbered patent requiring correction and that the said Letters Patent should read as corrected below.

Column 8, line 10, for the claim reference numeral "5" read -- 3 --.

Signed and sealed this 5th day of April 1960.

(SEAL)
Attest:

KARL H. AXLINE
Attesting Officer

ROBERT C. WATSON
Commissioner of Patents